(12) United States Patent
Huang et al.

(10) Patent No.: US 11,601,877 B2
(45) Date of Patent: Mar. 7, 2023

(54) SYSTEMS AND METHODS FOR EXPOSING NETWORK SLICES FOR THIRD PARTY APPLICATIONS

(71) Applicant: Verizon Patent and Licensing Inc., Basking Ridge, NJ (US)

(72) Inventors: Ye Huang, San Ramon, CA (US); Kristen Sydney Young, Mine Hill, NJ (US); Suzann Hua, Beverly Hills, CA (US); Miguel A. Carames, Long Valley, NJ (US); Kalyani Bogineni, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 31 days.

(21) Appl. No.: 17/144,785

(22) Filed: Jan. 8, 2021

(65) Prior Publication Data

US 2022/0225223 A1    Jul. 14, 2022

(51) Int. Cl.
*H04W 48/18* (2009.01)
*H04W 76/11* (2018.01)
*H04W 8/02* (2009.01)
*H04W 40/24* (2009.01)
*H04L 41/0893* (2022.01)

(52) U.S. Cl.
CPC ......... *H04W 48/18* (2013.01); *H04L 41/0893* (2013.01); *H04W 8/02* (2013.01); *H04W 40/248* (2013.01); *H04W 76/11* (2018.02)

(58) Field of Classification Search
CPC . H04W 48/18; H04W 76/11; H04W 41/0893; H04W 8/02; H04W 40/248
USPC ............... 370/338, 328, 329, 341, 345, 350
See application file for complete search history.

(56) References Cited

U.S. PATENT DOCUMENTS

| | | | | |
|---|---|---|---|---|
| 2018/0192471 A1* | 7/2018 | Li | ............ | H04W 4/60 |
| 2019/0313236 A1* | 10/2019 | Lee | ......... | H04W 80/10 |
| 2019/0342761 A1* | 11/2019 | Yu | .......... | H04W 48/16 |
| 2020/0267679 A1* | 8/2020 | Kim | ......... | H04W 8/24 |

* cited by examiner

*Primary Examiner* — Nghi H Ly

(57) ABSTRACT

A system includes one or more devices. The devices are configured to: receive a message indicating that a network slice has been deployed in a network, wherein the message includes information related to the network slice; send the information to an application that provides services to User Equipment (UE) devices subscribed to the network; and initiate updates to UE route selection policies (URSPs) in the network based on the information, allowing communications from UE devices to reach the network slice.

20 Claims, 10 Drawing Sheets

SYSTEMS AND METHODS FOR EXPOSING NETWORK SLICES FOR THIRD PARTY APPLICATIONS

BACKGROUND INFORMATION

Advanced wireless networks, such as Fifth Generation (5G) networks, have the capability to perform network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access networks, clouds, transport, Central Processing Unit (CPU) cycles, memory, etc. Furthermore, each network slice may be configured to meet a different set of requirements and be associated with a particular Quality of Service (QoS) class, type of service, and/or particular group enterprise customers associated with mobile communication devices.

DETAILED DESCRIPTION OF PREFERRED EMBODIMENTS

The following detailed description refers to the accompanying drawings. The same reference numbers in different drawings may identify the same or similar elements.

Many networks have the capability to create network slices over a physical or virtualized network to provide improved communication services to mobile devices. Network component vendors and operator may redesign various virtual network components, network slices and assurance services that use those components, may review and test the network slices and assurance services, and may deploy the slices. Furthermore, many systems, herein referred to as slice orchestration platforms, support at least partial automation of the preceding processes.

Because such network slice orchestration and LCM platforms, however, focus on the network slice design and deployment, they do not provide programmable linkages or application programming interfaces (APIs) pertaining to network slices between the service provider network and application platforms. Some of the applications are provided by a third party that needs the capability to address and control specific network slices for their applications and user equipment (UE) devices serviced by the applications. There is no standard for such linkages. For example, under the current Third Generation Partnership Project (3GPP) standards, the APIs for Network Exposure Functions (NEFs), to be described below, allow network functions to access deployed network slices using the NEF but does not provide a mechanism for third party applications to be notified of network slice deployment. The systems and methods described herein provide the missing linkages.

Figure 1:
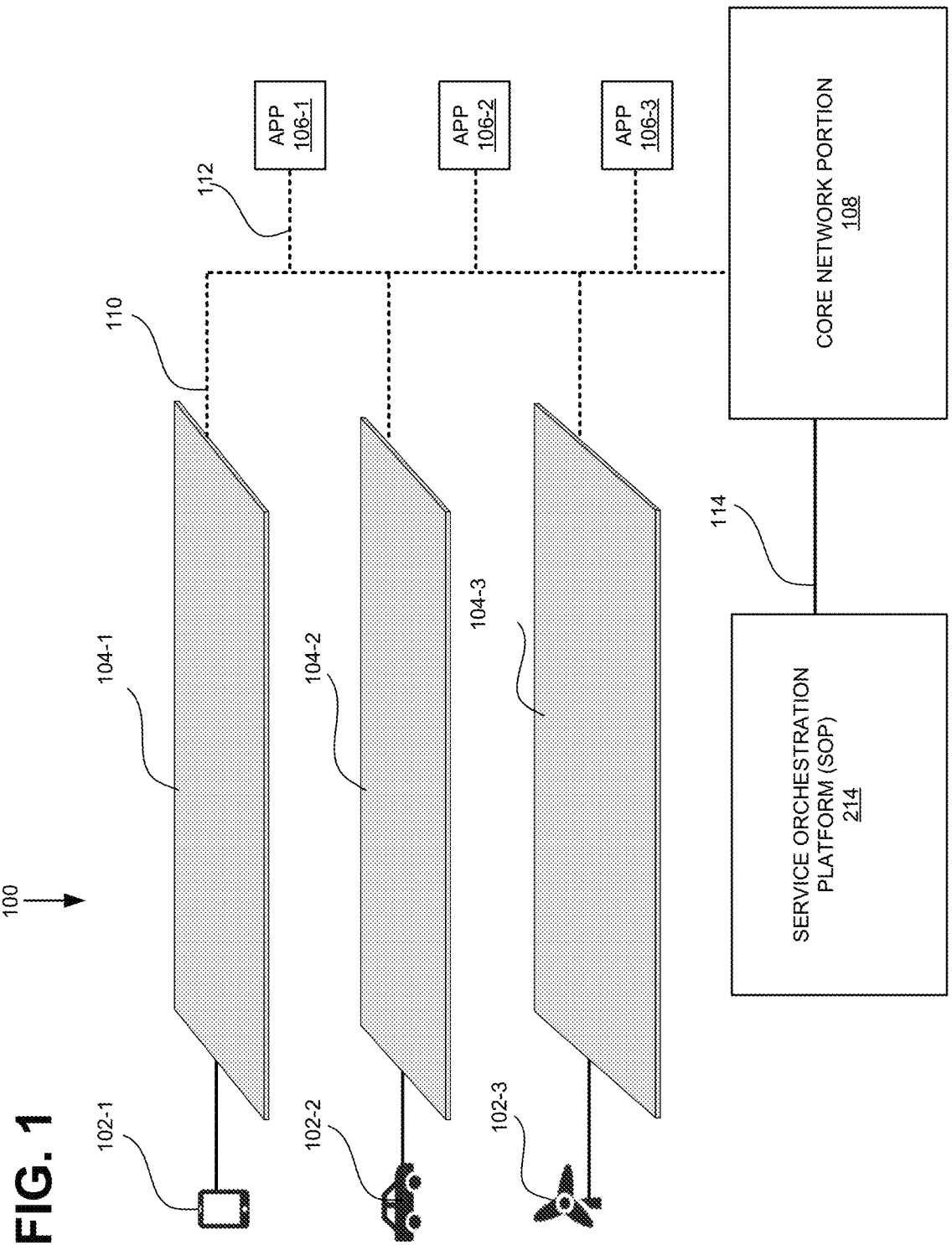
FIG. 1 depicts concepts described herein.

FIG. 1 depicts the concepts described herein. As shown, a provider network 100 includes UE devices 102-1 through 102-3, network slices 104-1 through 104-3, and applications 106-1 through 106-3. Network 100 also includes service orchestration platform (SOP) 214 and a core network portion 108. The number and arrangement of the components 102-108 are exemplary. In actual implementations, network 100 may include additional, fewer, or a different arrangement of components than those illustrated in FIG. 1.

In FIG. 1, UE devices 102-1 through 102-3 are serviced by corresponding network slices 104-1 through 104-3, to which each UE device 102 is attached. For simplicity, FIG. 1 does not show virtual network functions that are included in each of network slices 104. Applications 106-1 through 106-3 provide services to UE devices 102-1 through 102-3 over the corresponding network slices 104-1 through 104-3.

SOP 214 includes logic for designing, testing, and deploying network slices at various locations. For example, SOP 214 may provide updated network functions (e.g., designed and tested), incorporate them into newly architected network slices, and deploy the network slices over edge and core networks. More specifically, for example, assuming that SOP 214 has designed network slice 104-3, SOP 214 may deploy network slice 104-3 at a particular data center or data centers. Core network portion 108 includes components of a particular portion of network, herein referred to as "core network," to be described below with reference to other figures.

As further illustrated in FIG. 1, core network portion 108 communicates with slices 104 over path 110; applications 106 communicate with UE core network portion 108 over path 112; core network portion 108 communicates with applications over paths 112, and SOP 214 communicate with core network portion 108 over paths 114. Paths 110, 112, and 114 provide the linkages that enable greater automation network configuration associated with slice deployment. The linkages address several issues with currently available standard APIs. Components 102 through 108, which enable paths 110-114, are described below in greater detail, with reference to FIGS. 2-9.

Figure 2:
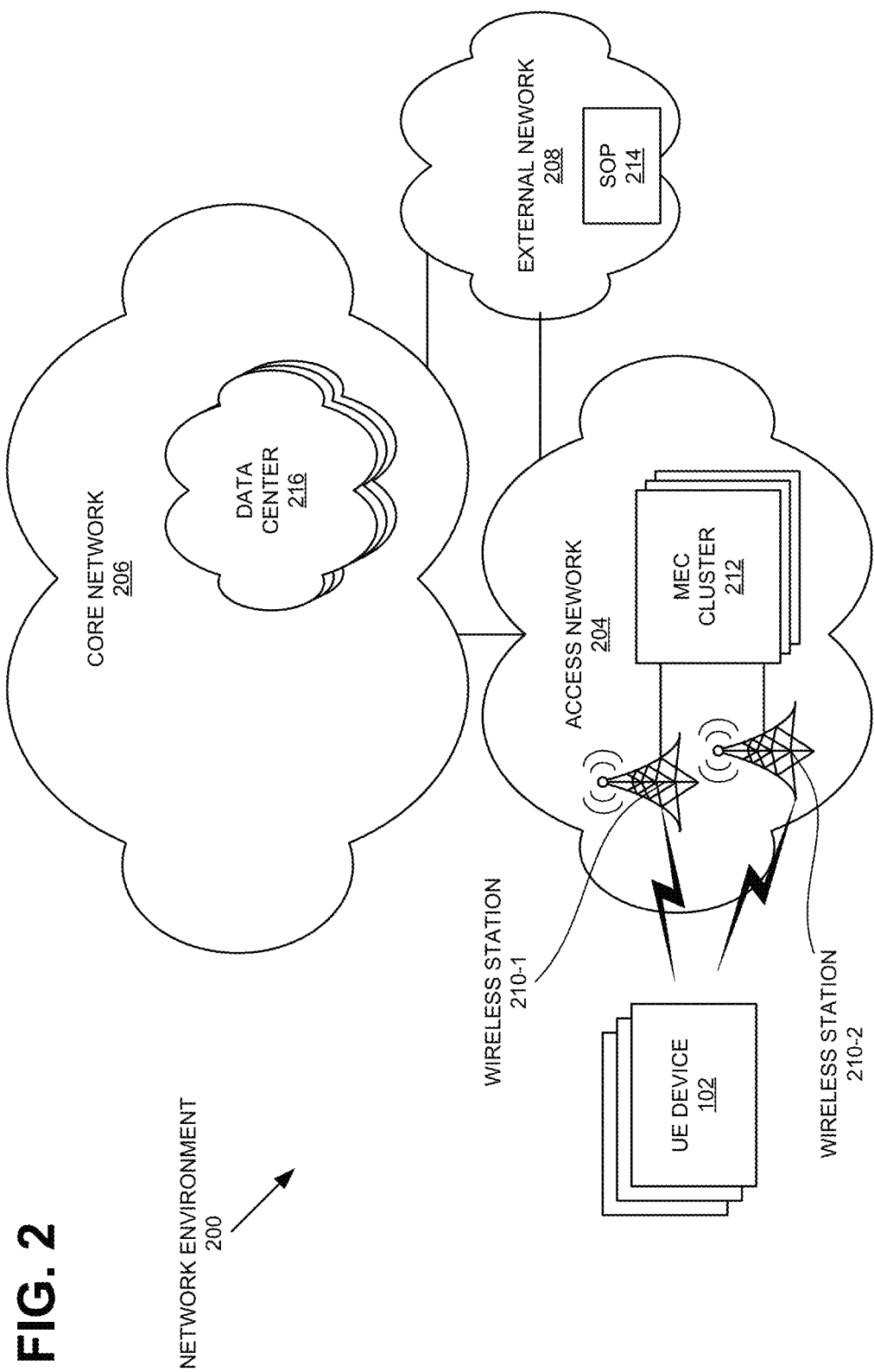
FIG. 2 illustrates an exemplary network environment in which the systems and methods described herein may be implemented.

FIG. 2 illustrates an exemplary network environment 200 in which the systems and methods described herein may be implemented. Network environment 200 may include one or more of UE device 102, access network 204, core network 206, and external network 208.

UE device 102 may include a wireless communication device. Examples of UE device 102 include: a smart phone; a tablet device; a wearable computer device (e.g., a smart watch); a laptop computer; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) (also known as Category M1 (CAT-M1)) devices and Narrow Band (NB)-IoT devices. UE device 102 may send packets to core network 206 (e.g., an application server in core network 206) over access network 204.

Access network 204 may allow UE device 102 to access core network 206. To do so, access network 204 may establish and maintain, with participation from UE device 102, an over-the-air channel with UE device 102; and maintain backhaul channels with core network 206. Access network 204 may convey information through these channels, from UE device 102 to core network 206 and vice versa. Access network 204 may also convey data from/to UE device 102 to/from external network 208.

Access network 204 may include a Fourth Generation (4G) radio network, a Fifth Generation (5G) radio network and/or another advanced radio network. These radio networks may include many wireless stations, which are illustrated in FIG. 2 as wireless stations 210-1 and 210-2 (generically referred to as wireless station 210 and collectively as wireless stations 210) for establishing and maintaining an over-the-air channel with UE device 102.

Wireless station 210 may include a 5G, 4G, or another type of wireless station (e.g., evolved Node B (eNB), next generation Node B (gNB), etc.) that includes one or more Radio Frequency (RF) transceivers. Wireless station 210 (also referred to as base station 210) may provide or support Machine-Type Communications (MTC)-related functions, such as 1.4 MHz wide enhanced MTC (eMTC) channel-related functions (i.e., Cat-M1), Low Power Wide Area (LPWA)-related functions such as NB-IoT technology-related functions, and/or other types of MTC technology-related functions; Dual connectivity (DC), and other types of LTE-Advanced (LTE-A) and/or 5G-related functions. In some implementations, wireless station 210 may be part of an evolved UMTS Terrestrial Network (eUTRAN). Wireless station 210 may include Remote Electronic Tilt (RET) capability for beam steering or beam shaping.

As further shown, wireless stations 210 may be coupled to MEC clusters 212 in access network 204. MEC clusters 212 may be located geographically close to wireless stations 210, and therefore also be close to UE devices 102 serviced by access network 204 via wireless station 210. Due to its proximity to UE device 102, MEC cluster 212 may be capable of providing services to UE devices 102 with minimal latency. Depending on the implementations, MEC clusters 212 may provide many core functions, but at network edges.

Core network 206 may include a local area network (LAN), a wide area network (WAN), a metropolitan area network (MAN), an optical network, a cable television network, a satellite network, a wireless network, a general packet radio service (GPRS) network, an LTE network (e.g., a 4G network), a 5G network, an ad hoc network, a telephone network, an intranet, or a combination of networks. The advanced networks within core network 206, such as 5G network. Core network 206 may also include an Internet Protocol (IP) network, such as an IP Multimedia Subsystem (IMS) network that may provide a Short Messaging Service (SMS), Voice-over-IP (VoIP) service, etc. Core network 206 may also other networks arranged to support network slicing.

Core network 206 may allow the delivery of communication services (e.g., Internet Protocol (IP) services) to UE device 102, and may interface with other networks, such as external network 208. Depending on the implementation, core network 206 may include 4G core network components (e.g., a Serving Gateway (SGW), a Packet data network Gateway (PGW), a Mobility Management Entity (MME), etc.), 5G core network components, or another type of core network component.

As further shown, core network 206 data centers 216. Data centers 216 may include computer devices (e.g., servers). In core network 206, the devices of data centers 216 may be arranged as part of network function virtualization infrastructure (NFVI) and/or a cloud computing platform. Some of the components of network slices may be instantiated at data centers 216. Although shown as part of core network 206, data centers 214 may also be implemented within external network 208 or MEC clusters 212 for varuiys purposes.

External network 208 may include networks that are external to core network 206. In some implementations, external network 208 may include packet data networks, such as an IP network. As shown, external network 208 may include SOP 214. SOP 214 may allow network operators to design and deploy network slices and slice assurance services. For designing a network slice or a Slice Assurance Service (SAS), SOP 214 may receive specific information from the network operators in particular formats, aggregate and store the inputs as profiles (also referred to as slice descriptors) in design catalogs. That is, slice descriptors define network slices and/or SASs. When needed, the network operator may request SOP 214 to instantiate the slice/SAS defined by the slice descriptor, without further design intervention.

In the implementation shown in FIG. 2, deployment of a network slice and/or a slice assurance service by SOP 214 may entail instantiation of network functions and/or sharing use of software and hardware components in access network 204, core network 206, and external network 208. As briefly touched upon above, SOP 214 may provide information pertaining to the deployed network slice to some components in core network 206. The core components may then relay relevant slice information to applications, such as third-party applications, and to network functions in network slices. Core components, network slice components, and components of SOP 214 that are involved in the exchange of slice information form the framework for the implementations described herein.

Figure 3:
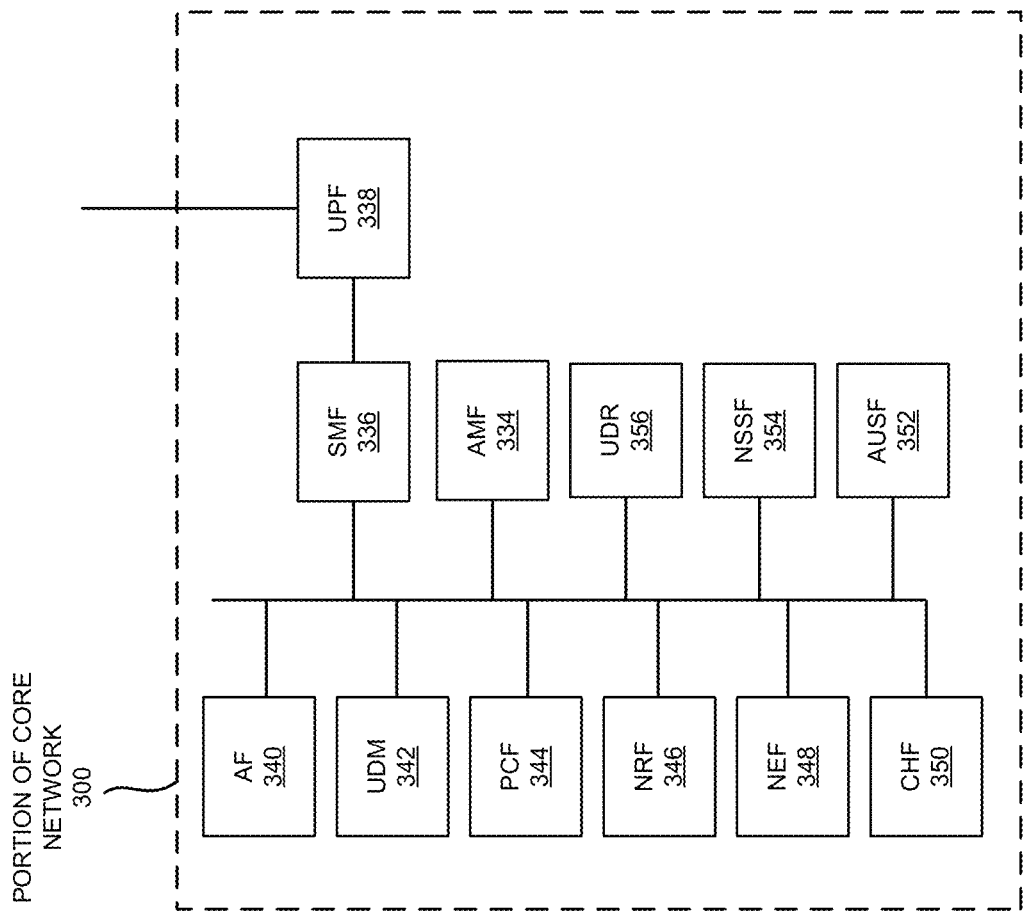
FIG. 3 illustrates exemplary functional components, in the core network of FIG. 2.

FIG. 3 illustrates exemplary functional components of core network 206 of FIG. 2. SOP 214 may deploy virtualized versions of one or more of the components shown in FIG. 3, as part of network slice. In FIG. 3, a portion 300 of core network 206 is shown as a 5G core network, although other types of core network components are possible. Portion 300 comprises a number of network function (NFs), which include: an Access and Mobility Function (AMF) 334 to perform registration management, connection management, reachability management, mobility management, and/or lawful intercepts; an Session Management Function (SMF) 336 to perform session management, session modification, session release, IP address allocation and management, Dynamic Host Configuration Protocol (DHCP) functions, and selection and control of a User Plane Function (UPF) 338; and a UPF 338 to serve as a gateway to packet data network, act as an anchor point, perform packet inspection, routing, and forwarding, perform QoS handling in the user plane, uplink traffic verification, transport level packet marking, downlink packet buffering, and/or other type of user plane functions.

Portion 300 further includes: an Application Function (AF) 340 to provide services associated with a particular application; a Unified Data Management (UDM) 342 to manage subscription information, handle user identification and authentication, and perform access authorization; a Policy Control Function (PCF) 344 to support policies to control network behavior, provide policy rules to control plane functions, access subscription information relevant to policy decisions, and perform policy decisions; a Network Repository Function (NRF) 346 to support service discovery, registration of network function instances, and maintain profiles of available network function instances; a NEF 348 to expose capabilities and events to other network functions, including third party network functions; a Charging Function (CHF) 350 to perform charging and billing functions; an Authentication Server Function (AUSF) 352 to render authentication services and other security related services to other network components; a Network Slice Selection Function (NSSF) 354 to select a network slice instance to serve a particular UE device 102; a Unified Data Repository (UDR) 356 to provide a repository for subscriber information and other types of information; and/or other types of network functions.

For simplicity, FIGS. 2 and 3 do not show all components that may be included in network environment 200 (e.g., routers, bridges, wireless access point, additional networks, additional UE devices, etc.), access network 204, core network 206, and external network 208. That is, depending on the implementation, network environment 200, access network 204, core network 206, and external network 208 may include additional, fewer, different, or a different arrangement of components than those illustrated in FIGS. 2 and 3.

Figure 4:
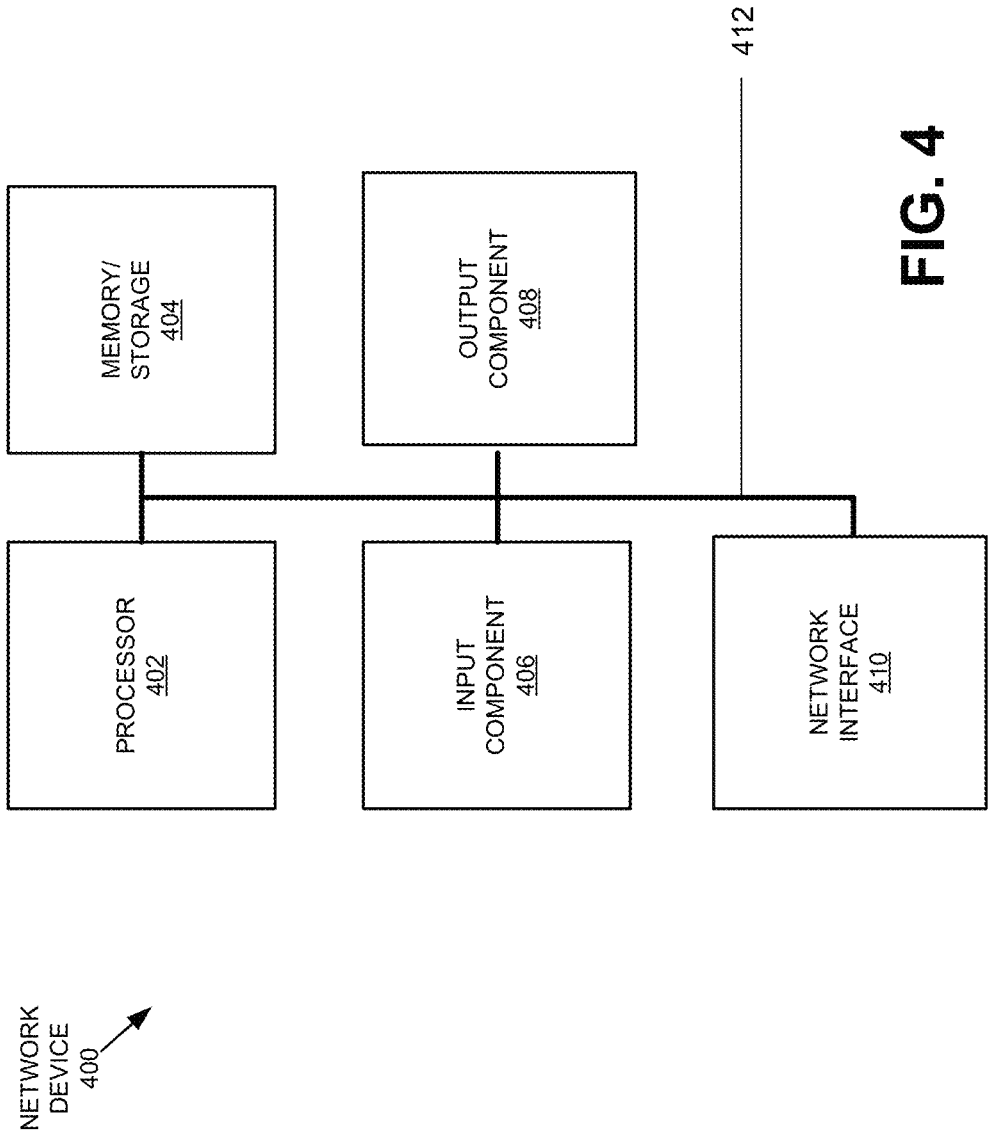
FIG. 4 depicts exemplary components of an exemplary network device of the networks of FIGS. 1-3.

FIG. 4 depicts exemplary components of an exemplary network device 400. One or more of network device 400 correspond to, are included in, or provide a hardware platform for implementation of any of the network components of FIGS. 1-3 (e.g., a router, a network switch, servers, gateways, wireless stations 210, UE device 102, SOP 214, etc.). As shown, network device 400 includes a processor 402, memory/storage 404, input component 406, output component 408, network interface 410, and communication path 412. In different implementations, network device 400 may include additional, fewer, different, or a different arrangement of components than the ones illustrated in FIG. 4. For example, network device 400 may include a display, network card, etc.

Processor 402 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 400 and/or executing programs/instructions.

Memory/storage 404 may include static memory, such as read only memory (ROM), and/or dynamic memory, such as random-access memory (RAM), or onboard cache, for storing data and machine-readable instructions (e.g., programs, scripts, etc.).

Memory/storage 404 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 404 may be external to and/or removable from network device 400. Memory/storage 404 may include, for example, a Universal Serial Bus (USB) memory stick, a dongle, a hard disk, off-line storage, a Blu-Ray® disk (BD), etc. Memory/storage 404 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 406 and output component 408 may provide input and output from/to a user to/from device 400. Input and output components 406 and 408 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 400.

Network interface 410 may include a transceiver (e.g., a transmitter and a receiver) for network device 400 to communicate with other devices and/or systems. For example, via network interface 410, network device 400 may communicate with wireless station 210. Network interface 410 may also include an Ethernet interface to a LAN, and/or an interface/connection for connecting device 400 to other devices (e.g., a Bluetooth interface). For example, network interface 410 may include a wireless modem for modulation and demodulation.

Communication path 412 may enable components of network device 400 to communicate with one another.

Network device 400 may perform the operations described herein in response to processor 402 executing software instructions stored in a non-transient computer-readable medium, such as memory/storage 404. The software instructions may be read into memory/storage 404 from another computer-readable medium or from another device via network interface 410. The software instructions stored in memory or storage (e.g., memory/storage 404, when executed by processor 402, may cause processor 402 to perform processes that are described herein.

Figure 5:
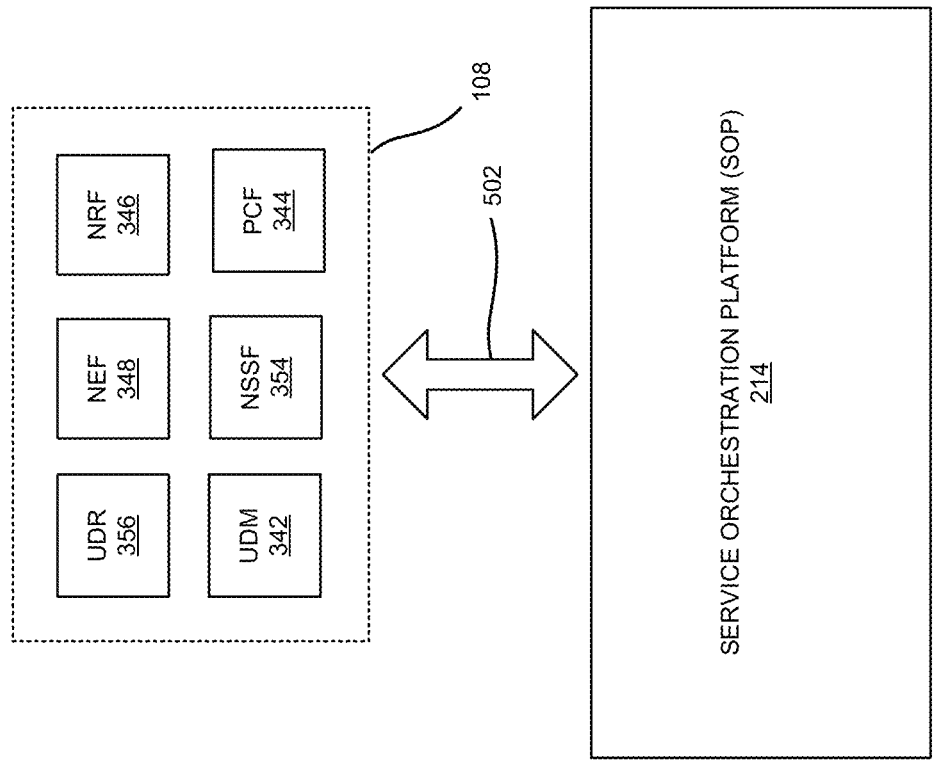
FIG. 5 shows exemplary communications, between a service orchestration platform (SOP) and components in a network, for automatic configuration of network components in response to slice deployment.

FIG. 5 illustrates one portion of the systems described herein at a high level. More specifically, FIG. 5 shows exemplary communications, between SOP 214 and components in a core network, for exposing network slice information to applications (e.g., AF 340, third party applications, etc.) and/or for automatic configuration of network components in response to slice deployment. As shown, network portion 500 includes SOP 214 and core network portion 108, which in turn comprises UDR 356, UDM 342, NEF 348, NSSF 354, NRF 346, and PCF 344.

In FIG. 5, when SOP 214 deploys a network slice, SOP 214 exchanges messages 502 with one or more components in network portion 108, to notify the core components within portion 108. The core components need to be aware of the newly deployed slice, should a third-party application request the core components for access TO the slice or request the core components to configure UE devices 102 that are serviced by the application.

The exchange of messages 502 is enabled through new APIs associated one or more of the core components. That is, SOP 214 uses the APIs to interact with one or more of the core components 108, such as NEF 348 and NSSF 354. In this example, NEF 348 would be informed of the deployed slice, and NSSF 354 would be given an S-NSSAI corresponding to the slice, a service profile (network service ID), a customer ID (e.g., an ID associated the application-related entity), and/or ownership of the network slice if the network sliced is created for a specific customer. If a third-party application that is aware of the slice requests a service pertaining to the slice via calls to NEF 348, the request would trigger actions by other network components, such as UDM 342 (e.g., for making changes to subscription information associated with a UE device 102 and the slice), UDR 356 (e.g., for storing the changes to the subscription information), and PCF 344 (e.g., for making policy changes at other core components such as AMF 334). Due to the new APIs, these configuration changes may be automated. In contrast, in the past implementations, standard APIs for the exchange of messages 502 do not exist, and hence, configuration changes associated with a deployed slice would need to be made to core network portion 108 manually.

Depending on the implementation, core network portion 108 may include additional, fewer, or different core components than those illustrated in FIG. 5. Furthermore, the core components may interact with SOP 214 in a manner different from those described above.

Figure 6:
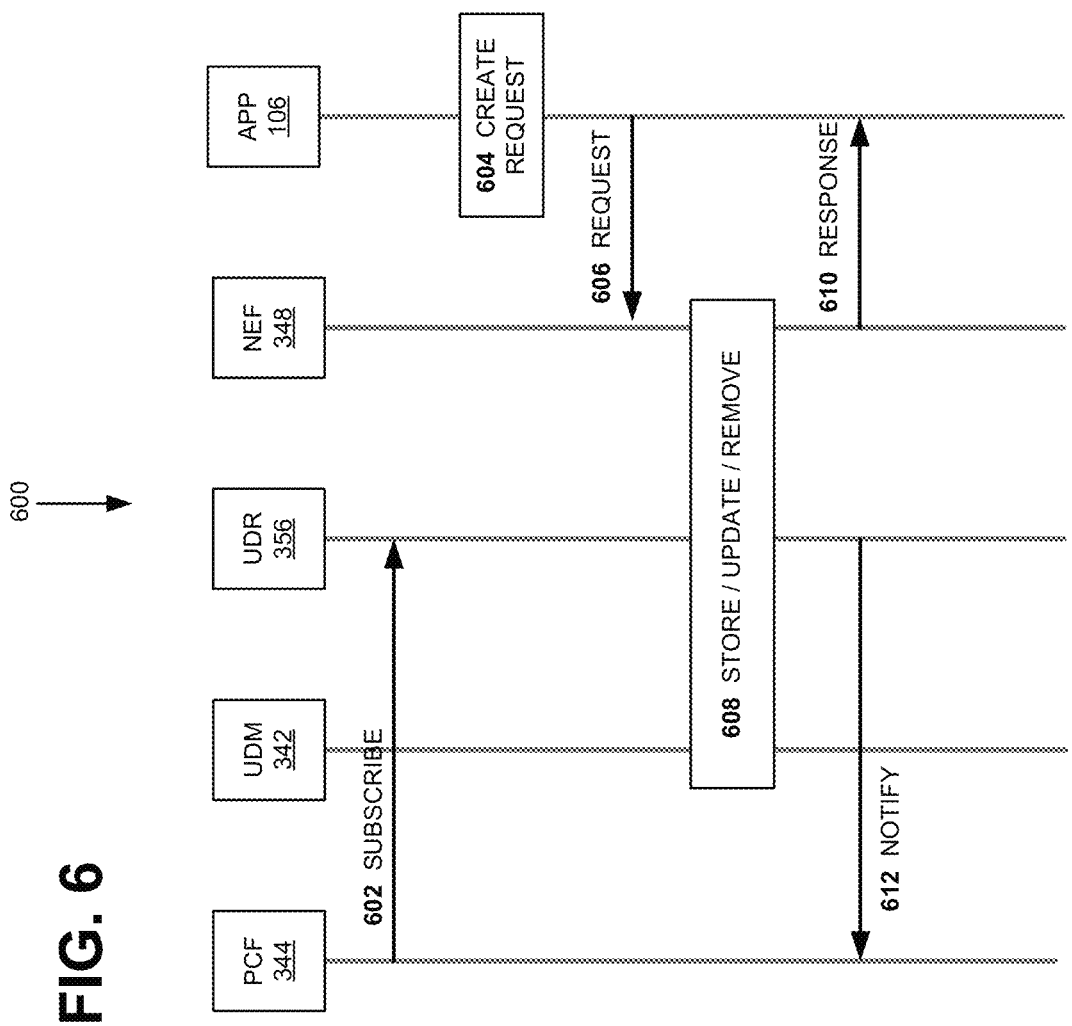
FIG. 6 is a signal flow diagram that shows an application sending a message to a Network Exposure Function (NEF) to request a slice-specific service.

FIG. 6 illustrates another portion of the systems described herein at a high level. More particularly, FIG. 6 is a signal flow diagram 600 that shows an application sending a message to NEF 348 to request a slice-specific service. Assume that a network slice has been deployed and that NEF 348 has relevant information about the deployed network slice (e.g., an S-NSSAI, a Network Service ID (NSID), a customer ID, etc.). Assume that PCF 344 has registered with UDR 356 to be notified of changes that are associated with a particular UE device 102 (signal 602).

After the deployment of the network slice and application 106 is notified of the deployed slice, application 106 may decide to configure or update network components with respect to the deployed network slice and one or more UE devices 102. To accomplish this, application 106 may create a request to configure network components request (box 604) and send the request to NEF 348 (signal 606). The request is specific for the deployed network slice and/or the UE devices 102.

To handle various requests from app 106, NEF 348 includes the mapping between app 106, a network service ID (service profile), and the network slice. NEF 348 stores and maintains this mapping in real time. Thus, for example, app 106 may subscribe with NEF 348 to receive network service creation notifications. If app 106 obtains the network slice identity through other means. NEF 348, au authenticate, /validate, and/or authorizes the network slice ID request.

When NEF348 receives the request, NEF 348 interacts with UDR 608 to change the subscription data associated with the UE devices 102, in a manner consistent with the request (box 608). Although not shown, the changes may require exchange of several messages between NEF 348, UDM 342, and UDR 356. In addition, NEF 348 may perform other operations, to fully provide the service requested by application 106 (not shown). Thereafter, NEF 348 may respond to application 106, indicating whether the requested service has been rendered and providing any information that application 106 may need to request related services from NEF 348 (signal 610). At UDR 356, since PCF 344 has registered to be notified of particular changes that pertain to the UE devices 102, UDR 356 notifies PCF 344 of the changes (signal 612), so that PCF 344 can enforce or implement its policies in accordance with the changes.

In FIG. 6, application 106 makes slice/UE device specific request using new APIs associated with NEF 348. Furthermore, NEF 348 renders the requested service using the PCF 344, UDR 356 and/or UDM 342. Hence, the APIs enable automation of network component configuration associated with the deployed network slice. In past implementations, the above-mentioned APIs for calling NEF 348 do not exist, and hence, application 106 would not be able to request slice-specific and/or UE device 102 specific network configuration changes. One reason is that, for example, many configurations in 5G network associated with a new network slice are been updated in disjoined fashion including the addition of the new slice to subscription data in UDM. This filing addressed those issues with closed real-time loop automation.

Figure 7:
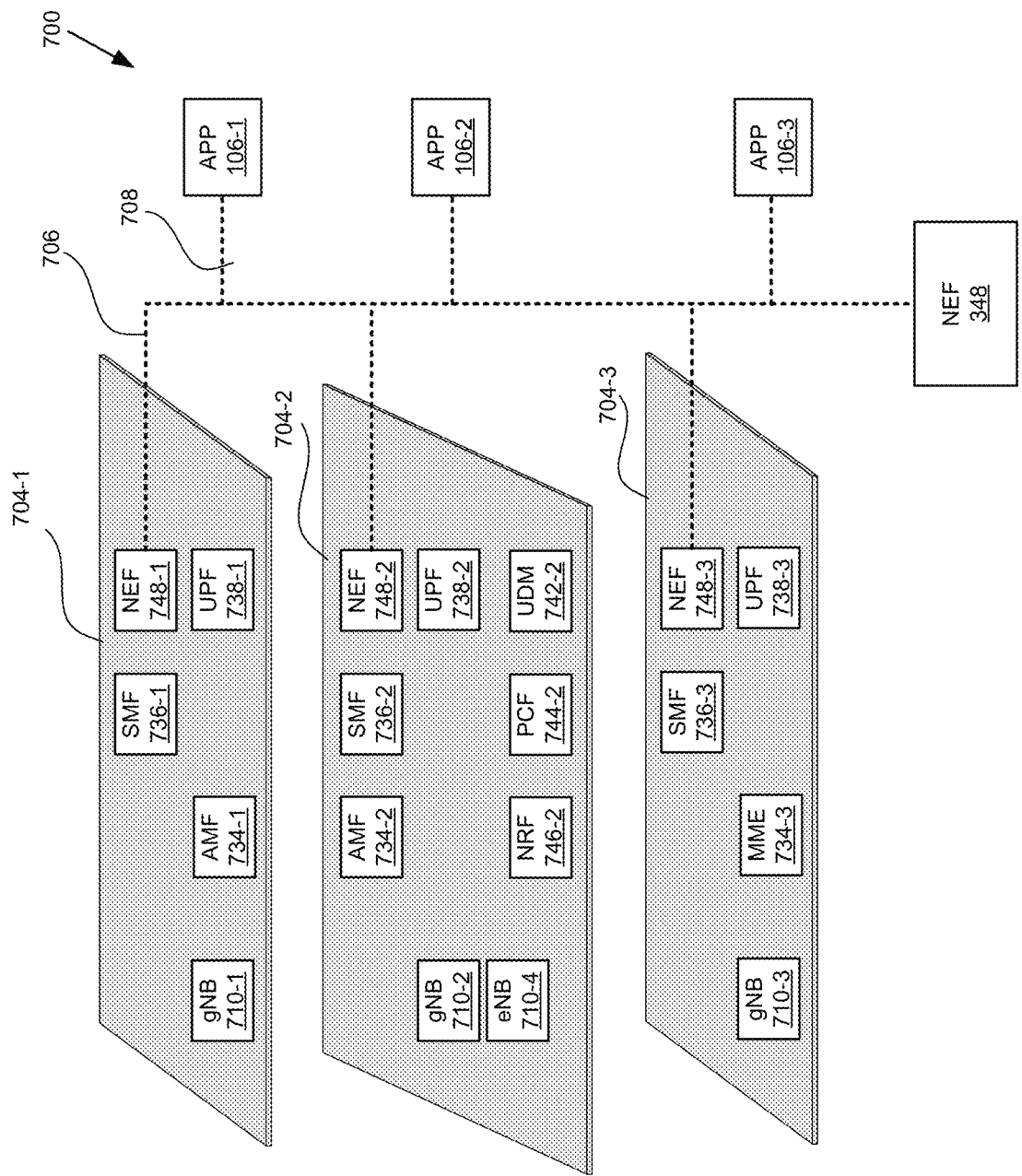
FIG. 7 shows exemplary communications from the NEF to other network components in a portion of the systems of FIG. 1 according to one implementation.

FIG. 7 illustrates yet another portion 700 of the systems described herein at a high level. More particularly, FIG. 7 depicts exemplary communications from the NEF 348 to other network components. As shown, portion 700 includes network slices 704-1, 704-2, and 704-3, each of which includes virtualized core network components and wireless stations. Network slice 704-1 includes a wireless station (gNB) 710-1, AMF 734-1, SMF 736-1, NEF 748-1, and UPF 738-1; network slice 704-2 includes a wireless station (gNB) 710-2 and 710-4, AMF 734-2, SMF 736-1, NEF 748-2, UPF 738-2, and NRF 746-2; and network slice 704-3 includes a wireless station (gNB) 710-3, SMF 736-3, NEF 748-3, and UPF 738-3. Each of the components of slices 704 are similar to those components described with reference to FIGS. 1 and 2 but are implemented within slices 704.

In FIG. 7, each NEF 748 and NEF 348 communicate through path 706, implemented by NEF APIs or callback APIs. Thus, for example, NEF 348 may notify NEF 748 by invoking an API call to NEF 748. Similarly, NEF 748 and applications 106 communicate with NEF 348 through path 708, implemented as an interface for NEF 348. For example, when NEF 348 has received information about a newly deployed network slice, application 106 may request NEF 348 to perform a particular service.

In FIG. 7, NEF 348 makes slice specific request to NEF 748 using APIs associated with NEFs 748 and sends slice-related notifications/calls to application 106 using a callback or other APIs. These API enable NEF 348 make slice-specific calls to NEFs 748. NEF 748 is a slice/edge element that may maintain the service profile (customer information. Hence, app 106 can access 748 directly for edge computing or localized access for some apps—bypassing central NEF 348 (See FIG. 10 for MEC app 954 accessing NEF 8480X via 1070). In the past implementations, the above-mentioned APIs for calling NEF 348 do not exist, and hence, NEF 348 would not be able to communicate the deployed slice-related information to NEF 748 or application 106.

Figure 8:
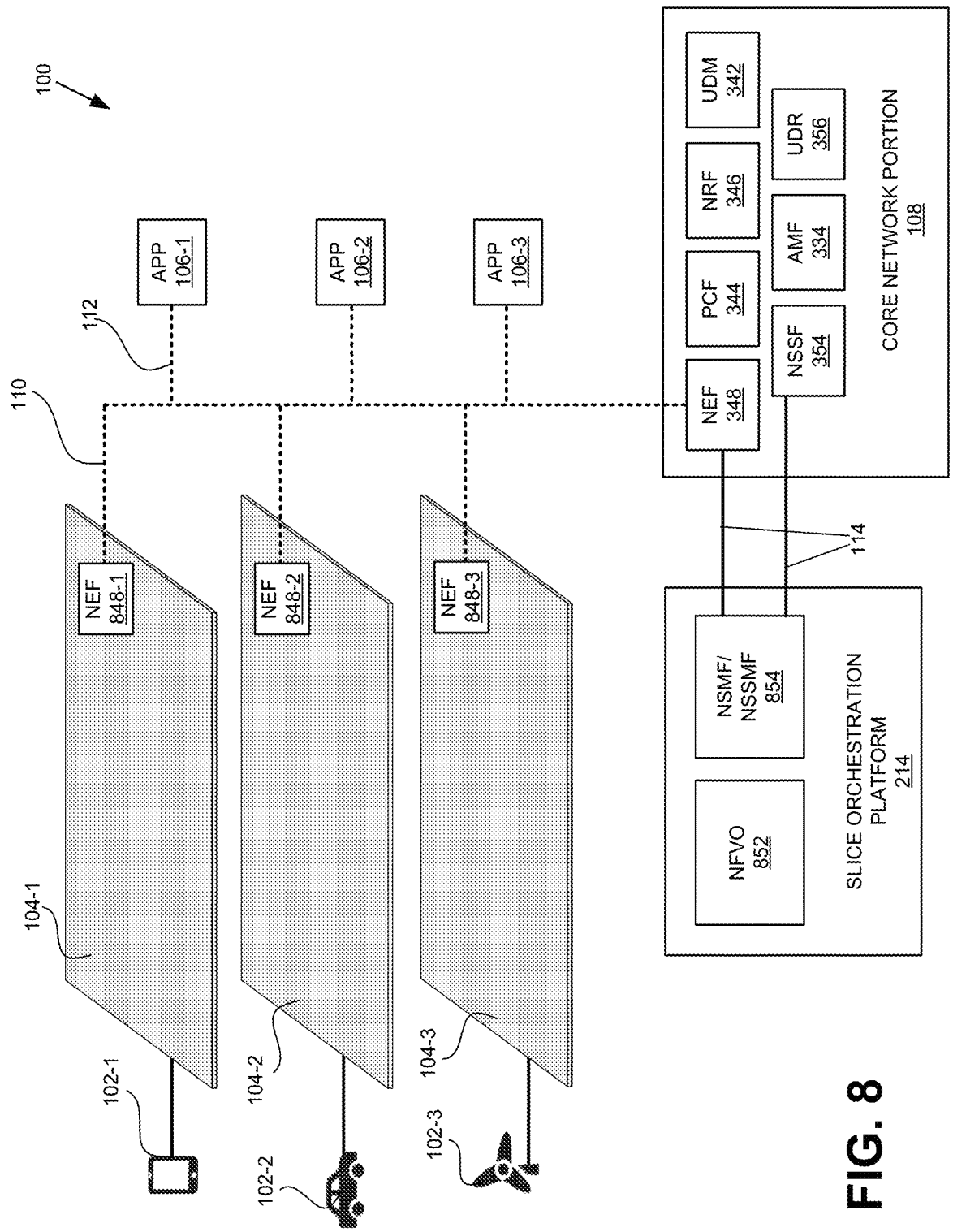
FIG. 8 illustrates an exemplary high-level architecture of a system described herein according to one implementation.

FIG. 8 illustrates an exemplary high-level architecture of the systems described herein. System 800 includes all the portions 500-700 described above with reference to FIGS. 5-7. In addition to showing all the components depicted in FIG. 1, FIG. 8 reveals some of the subcomponents of SOP 214 and core network portion 108.

As shown, SOP 214 includes Network Function Virtualization Orchestrator (NFVO) 852 and Network Slice Management Function (NSMF)/Network Slice Subnet Management Function (NSSMF) 854. NFVO 852 creates, removes, and/or updates network functions, such as virtualized versions of core components (e.g., AMF, SMF, UPF, NEF, etc.) at a particular location (e.g., data center 216). NSMF/NSSMF 854 instantiates and deploys network slices at subnets. When deploying a network slice, NSMF/NSSMF 854 engages NFVO 852, as NSFVO 852 creates the network functions included in each network slice. Core network portion 108 includes NEF 348, PCF 344, NRF 346, UDM 342, NSSF 354, AMF 334, and UDR 356. These components have been described above.

Paths 114 from NSMF/NSSMF 854 to NEF 348 and NSSF 354 enable communications between SOP 214 and core network portion 108 and correspond to the API that enables the exchange of messages 502 in FIG. 5 (e.g., the API for NEF 348). Path 112 between NEF 348 and applications 106 correspond to the paths (and therefore the APIs) that enable the signaling illustrated in FIG. 6 and calls from NEF 348 to applications 106 in FIG. 7. Path 110 correspond to API calls between NEF 848 and NEF 348.

Figure 9:
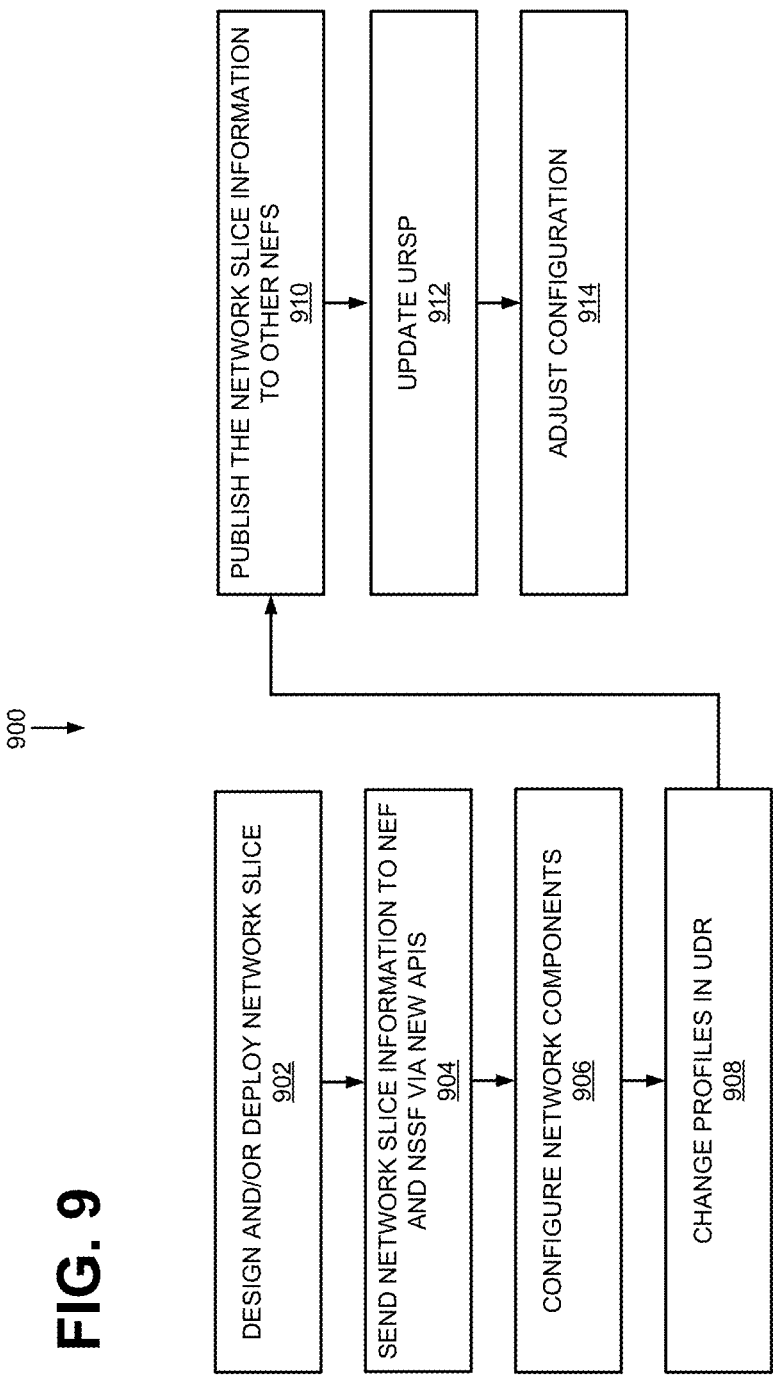
FIG. 9 is a flow diagram of a process that is associated with the network components illustrated in FIG. 8.
Figure 10:
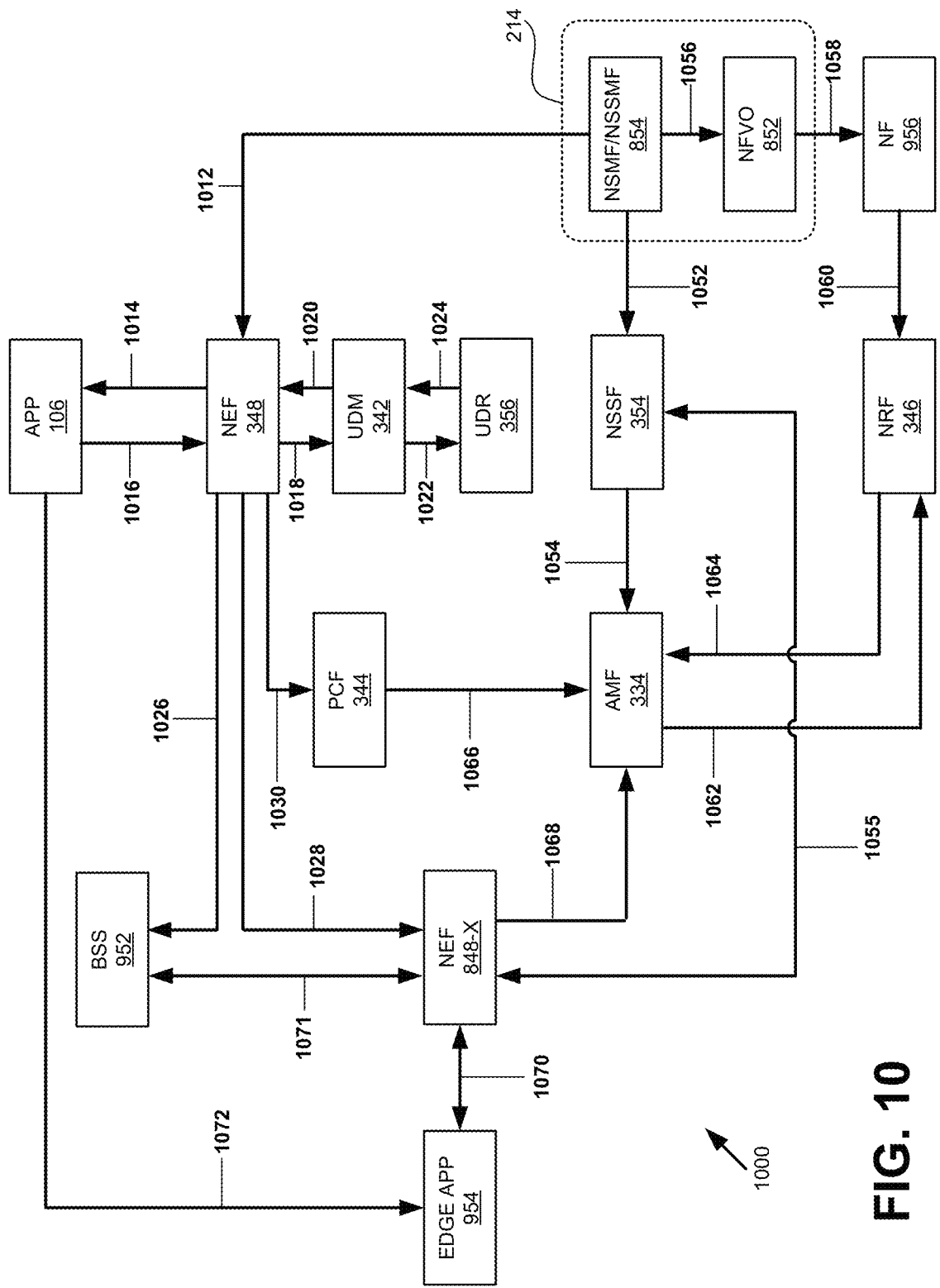
FIG. 10 illustrates exemplary calls between the network components of FIG. 8, according to one implementation.

FIG. 9 is a flow diagram of a process 900 that is associated with the network components depicted in FIG. 8, and FIG. 10 shows exemplary calls and signals (also referred to herein as messages) between the network components of FIG. 8 during the process 900 of FIG. 9. FIG. 10 is described along with FIG. 9. As shown, process 900 includes designing and/or deploying a network slice (block 902). The network slice may have been designed by a network operator at SOP 214.

Process 900 may include using the APIs that provide for path 114 NEF 348 and NSSF 354 to forward information pertaining to the deployed network slice to NEF 348 and NSSF 354 (block 904). In FIG. 10, NSMF/NSSMF 854 is shown as sending messages 1012 to NEF 348 and messages 1052 to NSSF 354. Message 1012 may include, for example, a customer application ID, Network Service ID (NSID), an S-NSSAI, Service Profile ID, a customer ID, etc. for the deployed slice. In addition, message 1052 may include the NSID, S-NSSAI, customer ID, NS ID, etc.

When NEF 348 receives the information from NSMF/NSSMF 854 (or yet another component in SOP 214), NEF 348 may notify or publish the information to application 106 that is identified by the customer application ID (block 906). The information sent to application 106 may include the NSID and S-NSSAI received from NSMF/NSSMF 854 and/or other information (e.g., a Network Service ID (NS ID), a customer ID, etc.). FIG. 10 shows NEF 348 sending the information in messages 1014 to application 106. Depending on the implementation, the information from NEF 348 may be conveyed to application 106 in various ways, such as by a callback interface (provided by application 106 to NEF 348) or in a reply by NEF 348 to a query from application 106 over an API provided by NEF 348.

Process 900, may further include application 106 using the information it received from NEF 348 regarding the deployed network slice and requesting NEF 348 to configure network components with respect to particular application parameters, a network slice, and/or UE devices 102 serviced by application 106 (block 906; signal 1016). The request may be made over an NEF 348 interface and may include, for example, a key-value pair for the parameter, identifiers for UE devices 102 that application 106 services, the S-NSSAI, and/or the UE Route Selection Policy (URSP) parameters.

NEF 348, in response to the request/message from application 106, may check with a Business Support System (BSS) 952 whether NEF 348 is permitted to modify, in accordance with the request from application 106, network component configurations and/or user profiles (signal 1026; FIG. 10). If a response from BSS 952 indicates that the changes are allowed, NEF 348 may request UDM 342/UDR 356 to change UE devices 102 profiles (block 908; signals 1018 and 1022) and receive responses 1020 and 1024 from UDM 342/UDR 356. When user profiles are updated with the new slice information, the slice would be available to UE devices 102 to select and/or use the slice (i.e., UE device 102 is provisioned with the slice). Although the sequence of signals between NEF 348, UDM 342, and UDR 356 in FIG. 10 are shown as 1018, 1022, 1024, and 1020, depending on the implementation, the order may be different.

In further response to the message 1012 from NSMF/NSSMF 854, NEF 348 may notify NEFs in other network slices (block 910). For example, as shown in FIG. 10, NEF 348 may notify NEF 848-X about the deployed network slice (signal 1028). The notification may include the application ID (for application 106), S-NSSAI for the deployed network slice, a customer ID, and/or the NSID.

NEF 348 may also request PCF 344 to update its UE Route Selection Policy (URSP) in light of the newly deployed network slice (block 912; signal 1030). A URSP indicates which network slice a UE device 102 and/or application 106 should use for a s. The request may include UE device IDs, the S-NSSAI, the application ID, and/or a customer ID. PCF 344 may enforce the policy by, for example, signaling AMF 324 (signal 1066) and/or other network components.

The above-described signaling between SOP 214 (or the components in SOP 214), NEF 348, application 106, BSS 902, NEF 348-X, and PCF 344 may occur through the APIs for the NEF 348 and/or other components. As a consequence of the above-described signaling, other components in network portion 108 may make further configuration adjustments (block 914). For example, with the deployment of the network slice, NFVO 852 may instantiate a new NF 956 (signal 1058), which may then register with NRF 346 (signal 1060). When NRF 346 is queried with a discovery request (signal 1062), NRF 346 may respond with information about the network function in a discovery response (signal 1064). In another example, when queried about network slices by AMF 334, NSSF 354 may provide the S-NSSAI for the newly deployed network slice (signal 1054).

Depending the implementation, application 106 may trigger other network signaling, such as application 106 notifying edge application 954 (signal 1070). It is also possible that edge application 904 for the network slice in which NEF 848-X resides to communicate with NEF 348 regarding the newly deployed network slice, such as its S-NSSAI, application ID, the NSID, the customer ID, etc. NEF 348 may route various NEF calls to other slices.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of processes have been described above regarding blocks illustrated in FIG. 9 and the signals in FIGS. 6 and 10, the order of the processing and signaling may be modified in other implementations. In addition, non-dependent processing may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more devices configured to:
   receive, from one or more network components that instantiated a new network slice and deployed the network slice in a network, a message that includes information describing related to the network slice;
   send the information to an application that provides services to User Equipment (UE) devices subscribed to the network; and
   send a request to a Policy Control Function (PCF) to initiate updating UE route selection policies (URSPs) in the network based on the information, allowing communications from the UE devices to reach the network slice,
   wherein the request includes identifiers for the UE devices, an identifier for the application, and a Single-Network Slice Selection Assistance Information (S-NSSAI) that identifies the network slice.

2. The system of claim 1, wherein when the one or more devices send the request to initiate updating the URSPs, the one or more devices are configured to:
   send the request from a Network Exposure Function (NEF) to the PCF to update the URSPs in the network.

3. The system of claim 1, wherein the one or more devices are further configured to:
   send a request to Unified Data Repository (UDR) to store the information.

4. The system of claim 1, wherein the message has been sent from a Network Slice Management Function (NSMF) or a Network Slice Subnet Management Function (NSSMF) that uses an Application Programming Interface (API) of a Network Exposure Function (NEF) in the network to send the information to the NEF.

5. The system of claim 1, wherein the message includes at least one of:
   an identifier for the application;
   a customer identifier (ID);
   a Single-Network Slice Selection Assistance Information (S-NSSAI) for the network slice; or
   a Network Service identifier (NSID).

6. The system of claim 1, wherein the one or more devices are further configured to:
   send a message to a Business Support System (BSS) in the network when evaluating whether user profiles that are stored in a Unified Data Repository are permitted to be modified in accordance with the information.

7. The system of claim 1, wherein the one or more devices are further configured to:
   receive a message from the application to provision selected UE devices with the network slice.

8. The system of claim 1, wherein the one or more devices are further configured to:
   receive, at a Network Slice Selection Function (NSSF), Single-Network Slice Selection Assistance Information (S-NSSAI) and a Network Service identifier (NSID).

9. The system of claim 1, wherein the one or more devices are further configured to:
   publish, from a Network Exposure Function (NEF), the information to other NEFs in different network slices in the network.

10. The system of claim 1, wherein the one or more devices are further configured to:
    route calls, from a Network Exposure Function (NEF), to other network NEFs at different network slices in the network.

11. A method comprising:
    receiving, from one or more network components that instantiated a new network slice and deployed the network slice in a network, a message that includes information describing related to the network slice;
    sending the information to an application that provides services to User Equipment (UE) devices subscribed to the network; and
    sending a request to a Policy Control Function (PCF) to initiate updating UE route selection policies (URSPs) in the network based on the information, allowing communications from the UE devices to reach the network slice,
    wherein the request includes identifiers for the UE devices, an identifier for the application, and a Single-Network Slice Selection Assistance Information (S-NSSAI) that identifies the network slice.

12. The method of claim 11, wherein sending the request includes:
    sending the request from a Network Exposure Function (NEF) to the PCF to update the URSPs in the network.

13. The method of claim 11, further comprising:
    sending a request to Unified Data Repository (UDR) to store the information.

14. The method of claim 11, wherein the message has been sent from a Network Slice Management Function (NSMF) or a Network Slice Subnet Management Function (NSSMF) that uses an Application Programming Interface (API) of a Network Exposure Function (NEF) in the network to send the information to the NEF.

15. The method of claim 11, wherein the message includes at least one of:

an identifier for the application;
Single-Network Slice Selection Assistance Information (S-NSSAI) for the network slice; or
a Network Service identifier (NSID).

16. The method of claim 11, wherein further comprising:
sending a message to a Business Support System (BSS) in the network when evaluating whether user profiles that are stored in a Unified Data Repository are permitted to be modified in accordance with the information.

17. The method of claim 11, further comprising:
receiving a message from the application to provision selected UE devices with the network slice.

18. The method of claim 11, further comprising:
receiving, at a Network Slice Selection Function (NSSF), a Single-Network Slice Selection Assistance Information (S-NSSAI) and a Network Service identifier (NSID).

19. A non-transitory computer-readable medium comprising processor-executable instructions, that when executed by one or more processors, cause the one or more processors to:
receive, from one or more network components that instantiated a new network slice and deployed the network slice in a network, a message that includes information describing the network slice;
send the information to an application that provides services to User Equipment (UE) devices subscribed to the network; and
send a request to a Policy Control Function (PCF) to initiate updating UE route selection policies (URSPs) in the network based on the information, allowing communications from the UE devices to reach the network slice,
wherein the request includes identifiers for the UE devices, an identifier for the application, and a Single-Network Slice Selection Assistance Information (S-NSSAI) that identifies the network slice.

20. The non-transitory computer-readable medium of claim 19, wherein the instructions further cause the one or more processors to:
publish, from a Network Exposure Function (NEF), the information to other NEFs in different network slices in the network.

* * * * *